United States Patent
Nakano et al.

(10) Patent No.: US 10,523,868 B2
(45) Date of Patent: Dec. 31, 2019

(54) IMAGING APPARATUS AND IMAGING SYSTEM

(71) Applicant: DENSO CORPORATION, Kariya, Aichi-pref. (JP)

(72) Inventors: Toshihisa Nakano, Kariya (JP); Tetsuya Kimata, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/622,574

(22) Filed: Jun. 14, 2017

(65) Prior Publication Data

US 2017/0359514 A1    Dec. 14, 2017

(30) Foreign Application Priority Data

Jun. 14, 2016    (JP) .................................. 2016-117800

(51) Int. Cl.

| | |
|---|---|
| H04N 7/18 | (2006.01) |
| B60L 1/00 | (2006.01) |
| B60Q 11/00 | (2006.01) |
| B60R 16/02 | (2006.01) |
| G01C 21/36 | (2006.01) |
| G03B 17/02 | (2006.01) |
| G03B 17/56 | (2006.01) |
| H04N 5/232 | (2006.01) |
| B60R 1/00 | (2006.01) |
| B60R 16/03 | (2006.01) |
| H04N 5/225 | (2006.01) |
| H04N 5/247 | (2006.01) |

(52) U.S. Cl.
CPC .......... *H04N 5/23241* (2013.01); *B60R 1/00* (2013.01); *B60R 16/03* (2013.01); *H04N 5/2252* (2013.01); *H04N 5/2253* (2013.01); *H04N 5/2257* (2013.01); *H04N 5/247* (2013.01); *B60R 2300/40* (2013.01)

(58) Field of Classification Search
CPC .... H04N 7/188; G08B 21/0476; G08B 21/06; G06K 9/00845; G06Q 40/08; G06Q 30/0283; B60R 11/0211; B60R 11/04
See application file for complete search history.

(56) References Cited

U.S. PATENT DOCUMENTS

| | | | |
|---|---|---|---|
| 2002/0158512 A1 | 10/2002 | Mizutani et al. | |
| 2010/0100276 A1* | 4/2010 | Fujinawa | ............. G07C 5/0891 701/32.2 |
| 2011/0304447 A1* | 12/2011 | Marumoto | ............. G07C 5/085 340/438 |

(Continued)

FOREIGN PATENT DOCUMENTS

| | | |
|---|---|---|
| JP | 2009-069885 | 4/2009 |
| JP | 2010-120423 A | 6/2010 |

(Continued)

*Primary Examiner* — Alison Slater
(74) *Attorney, Agent, or Firm* — Knobbe, Martens, Olson & Bear, LLP

(57) ABSTRACT

An imaging apparatus installed in a vehicle includes a power source section that is supplied with electric power from an electrical storage device of the vehicle, and a power supplying section that is supplied with the electric power from the power source section and supplies the electric power to an external device, which is an electronic device located outside the imaging apparatus.

16 Claims, 2 Drawing Sheets

(56) References Cited

U.S. PATENT DOCUMENTS

| | | | | |
|---|---|---|---|---|
| 2014/0300739 | A1* | 10/2014 | Mimar | H04N 7/188 |
| | | | | 348/148 |
| 2016/0061613 | A1* | 3/2016 | Jung | G01C 21/3632 |
| | | | | 701/49 |
| 2016/0216595 | A1* | 7/2016 | Carlson | G03B 17/02 |

FOREIGN PATENT DOCUMENTS

| | | |
|---|---|---|
| JP | 2014-196095 | 10/2014 |
| JP | 2015-228284 | 12/2015 |

* cited by examiner

IMAGING APPARATUS AND IMAGING SYSTEM

CROSS-REFERENCE TO RELATED APPLICATION

This application is based on and claims the benefit of priority from earlier Japanese Patent Application No. 2016-117800 filed Jun. 14 2016, the description of which is incorporated herein by reference.

BACKGROUND

Technical Field

The present invention relates to an imaging apparatus installed in a vehicle.

Related Art

Drive recorders are known which image a scene, for example, in front of a vehicle and store the images. For example, JP-A-2010-120423 discloses an in-vehicle apparatus in which an extension module is inserted into a predetermined slot to store images obtained by an in-vehicle camera, thereby functioning as a drive recorder.

An in-vehicle camera, such as a camera disclosed in JP-A-2010-120423, which images a scene around a vehicle, and a camera used for a drive recorder have different purposes. To achieve both purposes, two cameras are required to be provided. In this case, the wiring becomes more complex compared with a configuration using only one camera.

SUMMARY

An embodiment provides an imaging apparatus by which wiring can be simplified.

As an aspect of the embodiment, an imaging apparatus installed in a vehicle includes a power source section that is supplied with electric power from an electrical storage device of the vehicle, and a power supplying section that is supplied with the electric power from the power source section and supplies the electric power to an external device, which is an electronic device located outside the imaging apparatus.

DETAILED DESCRIPTION OF THE PREFERRED EMBODIMENTS

Hereinafter, an embodiment will be described with reference to the drawings.

1. Embodiment

1-1. Configuration

Figure 1:
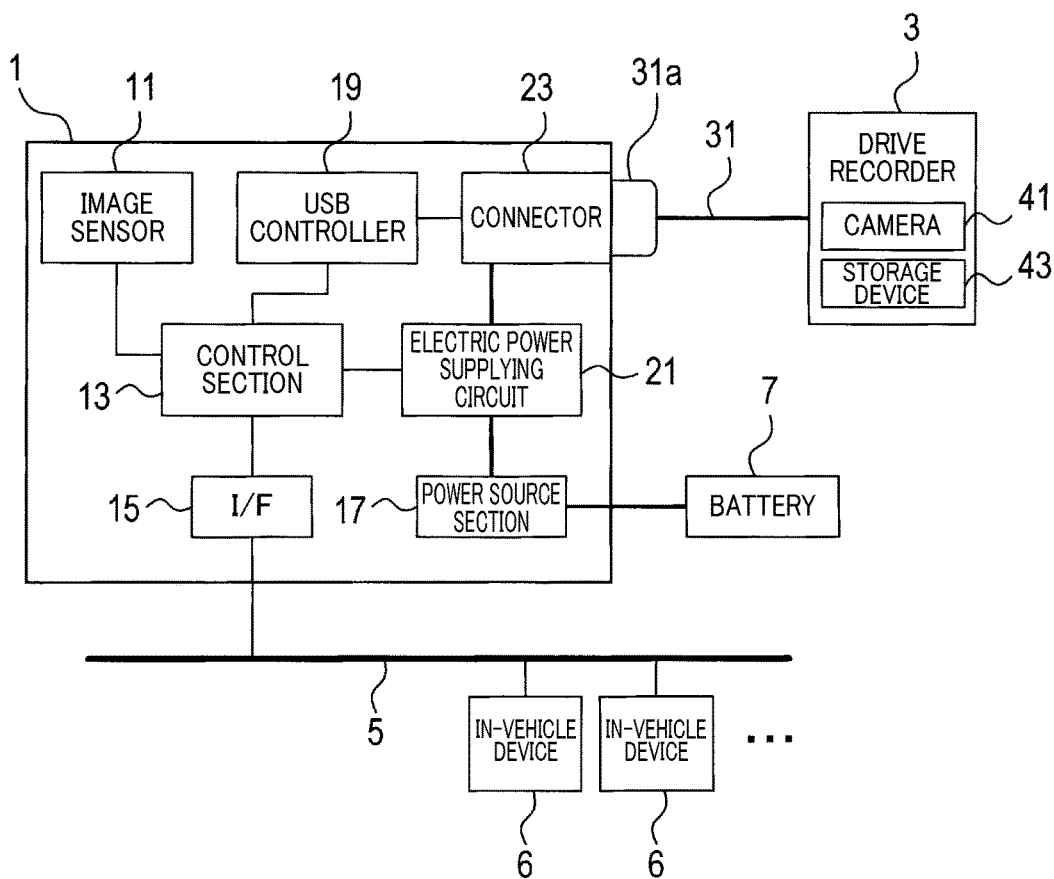
FIG. 1 is a block diagram showing a configuration of an imaging system.

FIG. 1 is a block diagram showing a configuration of an imaging system. An imaging apparatus 1 shown in FIG. 1 is installed in a vehicle and is configured to image a scene of the outside of the vehicle. The imaging apparatus 1 supplies electric power to a drive recorder 3 installed in the vehicle. In addition, the imaging apparatus 1 transmits information to one or more electronic devices (hereinafter, in-vehicle devices 6) connected via an in-vehicle network 5, receives information from the electronic devices, and outputs the received information to the drive recorder 3. Each of the in-vehicle devices 6 includes one or more controllers and one or more sensors.

The imaging apparatus 1 and the drive recorder 3 are connected by a connector and a communication system compliant with universal serial bus (hereinafter, USB) standard. The drive recorder 3 corresponds to an external device.

The imaging apparatus 1 includes an image sensor 11, a control section 13, a network interface (hereinafter, I/F) 15, a power source section 17, a USB controller 19, an electric power supplying circuit 21, and a connector 23.

The image sensor 11 acquires images. The image sensor 11 converts a subject image, which is formed by image formation from incident light which has been transmitted through one or more lenses, which are not shown in FIG. 1, to an electrical signal by using a photosensor array. Then, the image sensor 11 outputs the electrical signal to the control section 13.

The control section 13 is configured by a CPU, a ROM, and a RAM, which are main parts, and the like and integrally controls the imaging apparatus 1. The control section 13 may be configured to perform a recognition process of recognizing a lane, a road shape, an obstacle, a traffic sign, and the like based on a signal indicating the image output from the image sensor 11 and perform vehicle control based on the result of the recognition process. Hereinafter, images generated by the image sensor 11 and information on the result of the recognition process of the control section 13 are referred to as generation information.

The generation information is based on at least the image acquired by the imaging apparatus 1 and includes, in addition to the image, information obtained by processing of the image.

The generation information and a control signal for vehicle control are output from the I/F 15 to the in-vehicle network 5.

The I/F 15 is an interface for communication with the in-vehicle devices 6 provided to the vehicle. For example, in a case where the I/F 15 is connected with the in-vehicle devices 6 via a communication line, the I/F 15 may include a connector connected to the communication line, and an electronic circuit. In addition, in a case where the I/F 15 is connected to the in-vehicle devices 6 by radio, the I/F 15 may include a radio communication device.

The I/F 15 obtains a signal output from the in-vehicle device 6 to the in-vehicle network 5 and transmits the obtained signal to the control section 13. In addition, the I/F 15 outputs a signal, which has been output from the control section 13 to any of the in-vehicle devices 6, to the in-vehicle network 5. The information indicated by the signal output from the in-vehicle device 6 is hereinafter referred to as vehicle information. The I/F 15 and the control section 13 correspond to an information obtaining section.

The vehicle information includes, for example, a vehicle speed, a yaw rate, a gear position, a brake signal, collision information, an accelerator position, a steering angle, operating states of direction indicators, and position information of the vehicle. These pieces of information are output from sensors or controllers that can obtain the information.

The power source section 17 receives electric power supplied from a battery 7 installed in the vehicle and supplies required electric power to each part of the imaging apparatus 1. In FIG. 1, power supply lines connected to units other than the electric power supplying circuit 21 are not shown. The battery 7 corresponds to an electrical storage device. The power source section 17 may be connected to any of an accessory power source and a battery power source of the battery 7.

The USB controller 19 performs data communication compliant with the USB standard. The USB controller 19 outputs the vehicle information obtained by the I/F 15 and the generation information generated by the imaging apparatus 1 to the drive recorder 3. The control section 13 and the USB controller 19 correspond to an information output section and an external output section.

The electric power supplying circuit 21 converts electric power supplied from the power source section 17 to electric power to be output to the drive recorder 3, and supplies the converted electric power to the drive recorder 3 through the connector 23.

It is noted that a configuration may be provided in which electric power to be output is changed depending on a target device to which the electric power is supplied. Specifically, it can be considered that the control section 13 controls the electric power supplying circuit 21 depending on a connected device, which is recognized by the USB controller 19, and adjusts the voltage depending on the recognized device.

The connector 23 is configured to be connectable to a connection connector 31a of a cable 31 connected to the drive recorder 3. In the present embodiment, the connector 23 is a female connector compliant with the USB standard. In a state where the imaging apparatus 1 is connected to the drive recorder 3 via the connector 23, electric power can be supplied to the drive recorder 3 through the connector 23.

The electric power supplying circuit 21 and the connector 23 correspond to a power supplying section. It is noted that the electric power supplying circuit 21 may not necessarily be inside the imaging apparatus 1, for example, when electric power is supplied to the drive recorder 3 at the voltage adjusted by the power source section 17. In this case, the connector 23 corresponds to the power supplying section.

The drive recorder 3 is an electronic device that is positioned outside the imaging apparatus 1 and that is not connected to the in-vehicle network 5. The drive recorder 3 includes a camera 41 that images a scene in front of the vehicle, and a storage device 43. Images obtained by the camera 41 are stored in a storage area of the storage device 43.

In addition, the storage area of the storage device 43 stores vehicle information obtained by the imaging apparatus 1 through the in-vehicle network 5 and output to the drive recorder 3, and generation information generated in the imaging apparatus 1. The storage device 43 may include a detachable device such as an SD card (secure digital card).

Figure 2:
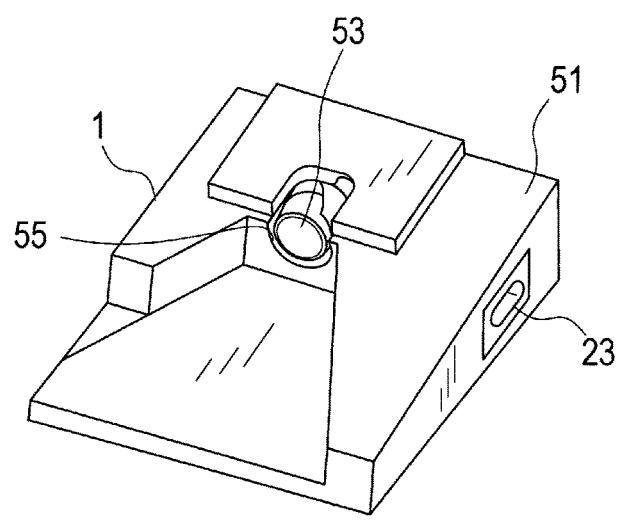
FIG. 2 is a perspective view showing an external appearance of an imaging apparatus.

As shown in FIG. 2, the imaging apparatus 1 is covered with a housing 51. The imaging apparatus 1 has a lens section 53 including a plurality of lenses for introducing light to the image sensor 11. The housing 51 is provided with an opening 55 through which the front portion of the lens section 53 is exposed. In addition, a side surface of the housing 51 is provided with a connector 23 to be connected to the drive recorder 3.

Figure 3:
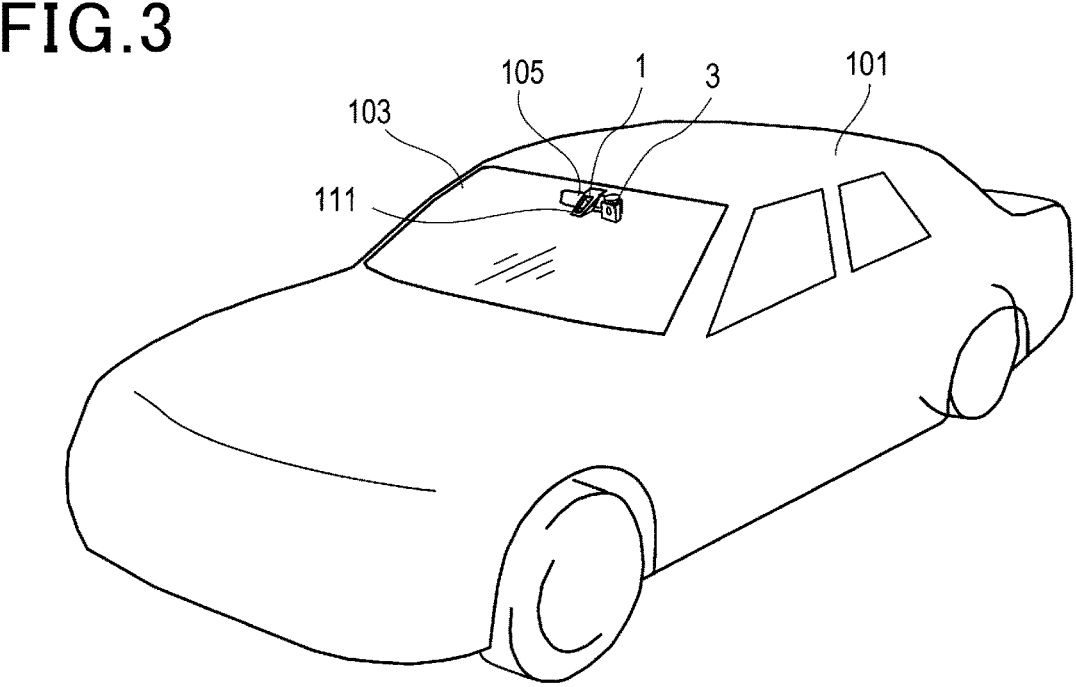
FIG. 3 is a perspective view showing a state where the imaging apparatus is attached to a vehicle.

As shown in FIG. 3, the imaging apparatus 1 and the drive recorder 3 are attached to an inner side of a windshield 103 of the vehicle 101, that is, a rear side of the windshield 103 and at positions in front of a rearview mirror 105 so as to be arranged in the right and left direction. Both the imaging apparatus 1 and the drive recorder 3 image a scene in front of the vehicle. Herein, the front and rear direction and the right and left direction are directions with reference to the vehicle 101.

Figure 4:
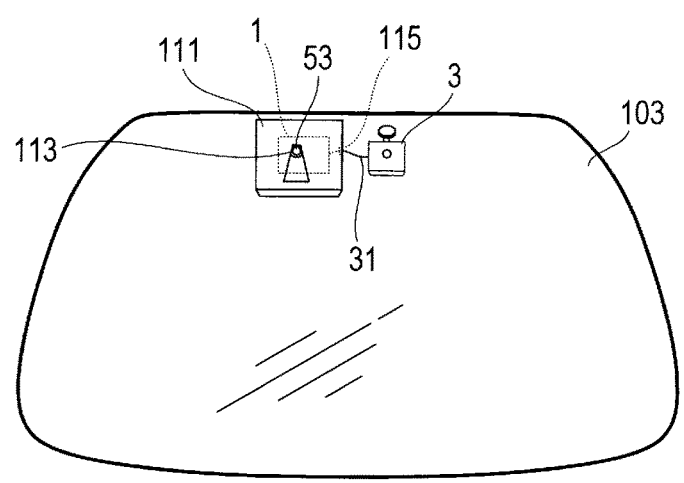
FIG. 4 is a diagram schematically showing the imaging apparatus viewed from a point of view in front of a windshield.

In addition, although the imaging apparatus 1 is covered with a cover member 111, the drive recorder 3 is disposed outside the cover member 111. As schematically shown in FIG. 4, the cover member 111 has an opening 113 through which the front portion of the lens section 53 is exposed and an opening 115 through which the cable 31 passes.

1-2. Advantageous Effects

According to the embodiment described above, the following advantageous effects can be obtained.

(1a) The imaging apparatus 1 can supply electric power to the drive recorder 3 through the connector 23. Hence, since the drive recorder 3 can be supplied with electric power by using a line having a length between the drive recorder 3 and the connector 23 of the imaging apparatus 1, wiring becomes easy when the drive recorder 3 is installed in the vehicle. In addition, the aesthetic appearance can be prevented from being lowered due to the arrangement of a long line in the interior of the vehicle.

(1b) The imaging apparatus 1 outputs the vehicle information and the generation information to the drive recorder 3. Thereby, for example, after an accident has occurred, and when driving conditions are analyzed by using information stored in the storage device 43, detailed analysis can be conducted based on a large amount of information.

(1c) Since the imaging apparatus 1 is connected to the drive recorder 3 by using the connector 23 compliant with the USB standard, the general versatility of connectable devices can be increased. For example, not only a drive recorder but also a device that is capable of being driven or charged by bus power of a USB can be connected.

2. Other Embodiments

It will be appreciated that the present invention is not limited to the configurations described above, but any and all modifications, variations or equivalents, which may occur to those who are skilled in the art, should be considered to fall within the scope of the present invention.

Figure 5:
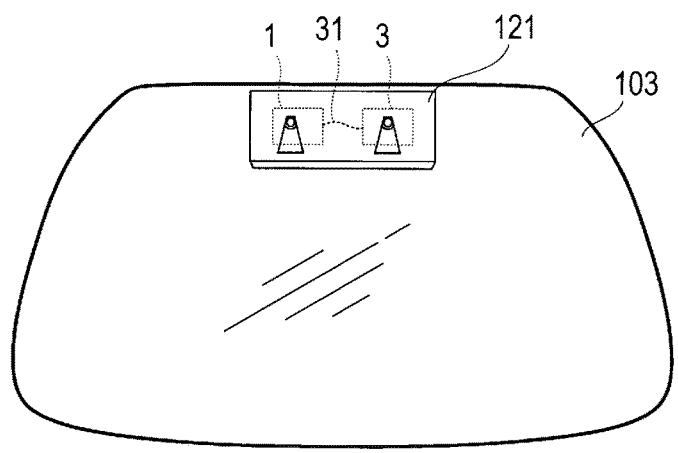
FIG. 5 is a diagram schematically showing the imaging apparatus viewed from a point of view in front of the windshield.

(2a) The above embodiment exemplifies a configuration in which the cover member 111 covers the imaging apparatus 1 and does not cover the drive recorder 3. However, as in a case of using a cover member 121 shown in FIG. 5, both the imaging apparatus 1 and the drive recorder 3 may be covered.

According to such a configuration, the cable 31 can be covered with the cover member 121, and the aesthetic appearance in the interior of the vehicle can be improved.

In addition, a configuration in which no cover member is used may be provided.

(2b) In the above embodiment, a configuration is exemplified in which the imaging apparatus 1 and the drive recorder 3 are connected by using the connector 23 compliant with the USB standard, and the communication with the drive recorder 3 and power feeding to the drive recorder 3 are performed. However, a configuration may be provided which performs communication by a connection system other than the USB standard. In addition, a configuration may be provided which performs the communication and the power feeding described above by using different cables.

(2c) In the above embodiment, the drive recorder 3 is exemplified as an electronic device connectable to the imaging apparatus 1. However, a connectable electronic device other than the drive recorder 3 may be provided. Such an electronic device may be configured so that only power feeding from the imaging apparatus 1 is performed, or may be configured so that the power feeding is performed and so as to obtain information.

(2d) In the above embodiment, a configuration is exemplified in which the connector 23 is formed in the housing 51. However, a connector may be provided to the cover member 111.

(2e) Arrangement of the imaging apparatus 1 and the drive recorder 3 is not limited to that of the above embodiment, and the imaging apparatus 1 and the drive recorder 3 can be disposed at various positions.

(2f) Functions of one component in the above embodiment may be divided among a plurality of components. Functions of a plurality of components may be provided by one component. A plurality of functions of a plurality of components may be provided by one component. One function provided by a plurality of components may be provided by one component. Part of the configuration of the above embodiment may be omitted. At least part of the configuration of the embodiment may be added to or replaced with the configuration of another embodiment.

(2g) The present invention can be achieved by various embodiments, in addition to the imaging apparatus 1, such as a system including the imaging apparatus 1 as a component, a program allowing a computer to function as the imaging apparatus 1, and a non-transitory computer readable recording medium, for example, a semiconductor memory, storing the program.

(2h) Basic functions of a drive recorder may be provided in the imaging system so that the imaging system functions as the drive recorder only by connecting a general-purpose recording drive, such as a commercially available hard disk drive, to the imaging system. According to the basic functions, images obtained by a camera are continuously stored in an external general-purpose recording drive with overwriting. If sudden acceleration or deceleration of the vehicle is detected, the images obtained at that time are saved.

Hereinafter, an aspect of the above-described embodiments will be summarized.

As an aspect of the embodiment, an imaging apparatus (1) installed in a vehicle includes: a power source section (17) that is supplied with electric power from an electrical storage device (7) of the vehicle; and a power supplying section (21, 23) that is supplied with the electric power from the power source section and supplies the electric power to an external device (3), which is an electronic device located outside the imaging apparatus.

According to the configuration, the external device can be supplied with electric power from the imaging apparatus. Thus, the line to the external device can be shortened, whereby the external device can be easily attached, and the aesthetic appearance of the vehicle interior can be prevented from being deteriorated.

As another aspect of the embodiment, an imaging system includes: an imaging apparatus (1) that is installed in a vehicle; an external device (3) that is an electronic device located outside the imaging apparatus; and a cover member (111, 121) that covers the imaging apparatus. The imaging apparatus includes: a power source section (17) that is supplied with electric power from an electrical storage device (7) of the vehicle; and a power supplying section (21, 23) that is supplied with the electric power from the power source section and supplies the electric power to the external device.

According to the configuration, the external device can be supplied with electric power from the imaging apparatus. Thus, wiring can be simplified, and the aesthetic appearance can be prevented from being deteriorated. In addition, the cover member can improve the aesthetic appearance of the interior of the vehicle.

What is claimed is:

1. An imaging system installed in a vehicle, the imaging system comprising:
an imaging apparatus comprising:
a first camera;
a power source section that is supplied with electric power from an electrical storage device of the vehicle; and
a drive recorder located outside the imaging apparatus comprising:
a second camera different from the first camera; wherein the second camera images a scene around the vehicle; and
a storage unit; and
a housing; wherein the housing comprises an opening formed through one side surface thereof, the one side surface corresponding to a length direction of the vehicle; and
the imaging apparatus further comprising:
a power supplying section is provided in the housing of the imaging apparatus and supplied with the electric power from the power source section and supplies the electric power to the drive recorder;
wherein:
the imaging apparatus is attached to a windshield of the vehicle and is located within the housing;
the imaging apparatus is configured to:
image, by the first camera, a scene in front of the vehicle; and
perform, based on an image obtained by the first camera, a recognition process in front of the vehicle;
wherein the power supplying section further comprises a connector connected to the drive recorder via a cable, wherein both the electric power supplied from the power supplying section and a result of the recognition process are commonly output to the drive recorder through the connector; and
wherein the power supplying section connector is located in the housing so as to be accessible through the opening and connect to the drive recorder via the cable.

2. The imaging system according to claim 1, further comprising:

an information obtaining section that obtains vehicle information output from at least one of one or more controllers and one or more sensors provided to the vehicle; and
an information output section that outputs the vehicle information obtained by the information obtaining section to the drive recorder.

3. The imaging system according to claim 1, further comprising an external output section that outputs generation information generated by the imaging apparatus to the drive recorder.

4. The imaging system according to claim 1, further comprising an interface to an in-vehicle network, wherein the in-vehicle network receives vehicle information output from at least one of one or more controllers and one or more sensors provided to the vehicle.

5. The imaging system according to claim 1, further comprising a controller circuit in communication with the connector, wherein the controller circuit is configured to recognize a type of drive recorder.

6. The imaging system according to claim 1, further comprising a control circuit configured to control the power supplying section by adjusting a voltage value depending on a type of drive recorder.

7. The imaging system according to claim 1, wherein:
the storage unit of the drive recorder is configured to store information based on the result of the recognition process outputted through the connector.

8. The imaging system according to claim 1, wherein the cable is a universal serial bus cable.

9. An imaging system comprising:
an imaging apparatus that is installed in a vehicle;
a drive recorder located outside the imaging apparatus, the drive recorder comprising:
  a second camera; wherein the second camera images a scene around the vehicle; and
  a storage unit; and
a housing of the imaging apparatus, wherein the housing comprises an opening formed through one side surface thereof, the one side surface corresponding to a length direction of the vehicle; and
a cover member that covers the imaging apparatus, wherein the imaging apparatus further comprises:
  a first camera different from the second camera;
  a power source section that is supplied with electric power from an electrical storage device of the vehicle; and
  a power supplying section that is supplied with the electric power from the
power source section and supplies the electric power to the drive recorder, wherein:
  the imaging apparatus is attached to a windshield of the vehicle and is configured to:
    image, by the first camera, a scene in front of the vehicle; and
    perform, based on an image obtained by the first camera, a recognition process in front of the vehicle;
  the power supplying section is provided in the housing of the imaging apparatus and comprises a connector connected to the drive recorder via a cable;
  the power supplying section supplies the electric power to the drive recorder, both the electric power supplied from the power supplying section and a result of the recognition process commonly output to the drive recorder through the connector; and
  the power supplying section connector is located in the housing so as to be accessible through the opening and connect to the drive recorder via the cable.

10. The imaging system according to claim 9, wherein the cover member covers the imaging apparatus and the drive recorder.

11. The imaging system according to claim 10, wherein the cover member includes openings facing the front of the vehicle for each of the imaging apparatus and the drive recorder.

12. The imaging system according to claim 11, wherein each opening exposes a front portion of a lens for the imaging apparatus and for the drive recorder.

13. The imaging system according to claim 10, wherein the housing comprises an opening formed in a trapezoidal shape having two parallel sides and with non-parallel sides expanding outward toward the front of the vehicle.

14. The imaging system according to claim 10, wherein the imaging system further comprises a cable connected through the opening formed through the one side surface of the housing to the drive recorder, wherein the cable is located under the cover member.

15. The imaging system according to claim 9, further comprising an interface to an in-vehicle network, wherein the in-vehicle network is further in communication with one or more in-vehicle devices.

16. The imaging system according to claim 9, wherein the cable is a universal serial bus cable.

* * * * *